United States Patent
Schuster et al.

(10) Patent No.: US 7,672,884 B2
(45) Date of Patent: Mar. 2, 2010

(54) METHOD AND SYSTEM FOR RULE-BASE COMPLIANCE, CERTIFICATION AND RISK MITIGATION

(75) Inventors: James V. Schuster, Cincinnati, OH (US); John Clopton Dunaway, Santa Fe, NM (US); Gifford Keen, Santa Fe, NM (US); Mitchell Vibbert, Corrales, NM (US)

(73) Assignee: Simpliance, Inc., Cincinnati, OH (US)

( * ) Notice: Subject to any disclaimer, the term of this patent is extended or adjusted under 35 U.S.C. 154(b) by 907 days.

(21) Appl. No.: 10/836,736

(22) Filed: Apr. 30, 2004

(65) Prior Publication Data

US 2005/0228685 A1  Oct. 13, 2005

Related U.S. Application Data

(60) Provisional application No. 60/560,234, filed on Apr. 7, 2004.

(51) Int. Cl.
*G06Q 40/00* (2006.01)
(52) U.S. Cl. .................. 705/35; 705/1; 705/7; 705/8
(58) Field of Classification Search .................. 705/35, 705/1, 7, 8
See application file for complete search history.

(56) References Cited

U.S. PATENT DOCUMENTS

| | | | |
|---|---|---|---|
| 5,574,905 A | 11/1996 | deCarmo | |
| 5,874,955 A | 2/1999 | Rogowitz et al. | |
| 6,236,994 B1 | 5/2001 | Swartz et al. | |
| 6,341,287 B1 * | 1/2002 | Sziklai et al. | 707/102 |
| 6,385,589 B1 | 5/2002 | Trusheim et al. | |
| 6,493,693 B1 | 12/2002 | Hill | |
| 6,529,876 B1 | 3/2003 | Dart et al. | |
| 6,912,502 B1 * | 6/2005 | Buddle et al. | 705/1 |
| 2002/0143595 A1 * | 10/2002 | Frank et al. | 705/8 |
| 2002/0184068 A1 * | 12/2002 | Krishnan et al. | 705/8 |
| 2003/0069983 A1 * | 4/2003 | Mukund | 709/229 |
| 2003/0153991 A1 * | 8/2003 | Visser et al. | 700/79 |

OTHER PUBLICATIONS

Microsoft Computer Dictionary, 5th Edition, Microsoft Press, 2002, p. 193.*

* cited by examiner

*Primary Examiner*—James P Trammell
*Assistant Examiner*—Shahid R Merchant
(74) *Attorney, Agent, or Firm*—Dinsmore & Shohl LLP

(57) ABSTRACT

The present invention relates to a system and method for carrying out, facilitating, overseeing and otherwise managing initial and ongoing compliance, certification, risk mitigation and/or loss prevention, as it relates to a rule by analyzing and arranging the rule into a set of algorithms and documents. Information about an entity is input, compared to the rule by way of a set of algorithms, documented, and a report setting forth the compliance requirements and then-current compliance with the rule of the entity is provided. The entity is also provided with any documents required to ensure compliance with the rule.

26 Claims, 9 Drawing Sheets

METHOD AND SYSTEM FOR RULE-BASE COMPLIANCE, CERTIFICATION AND RISK MITIGATION

CROSS-REFERENCE TO RELATED APPLICATIONS

This application for a patent claims priority to U.S. Provisional Application No. 60/560,234 as filed Apr. 7, 2004.

BACKGROUND

1. Field of the Invention

The present invention pertains to the field of rule-base compliance, certification, and risk mitigation and loss prevention, as it relates to rules of authoritative bodies to which one or more entities are, may be, are believed to be or have agreed to be subject.

2. Discussion of the Prior Art

Society is governed by rules of its governmental and non-governmental authoritative bodies to which its people, businesses, institutions and other entities are subject. Given the rudiments of society, that will not change.

Examples of governmental and non-governmental authoritative bodies include, but are not limited to the entities to which one or more of society's entities are, may be, are believed to be or have agreed, such as their federal/national, state/commonwealth/territorial, local and governments, departments, agencies, commissions, divisions, courts, tribunals, offices and other entities; international unions, tribunals and other international entities; professional and other associations; joint and other commissions; certification and accreditation bodies; quasi-governmental bodies and entities; standards boards and other related entities; their insurers, re-insurers, financial institutions and related entities; for- and non-profit corporation compliance, rule-making, risk mitigation and loss prevention departments, divisions, offices, officials and bodies; and so forth.

Examples of rules promulgated, enforced, by or otherwise of such governmental and non-governmental authoritative bodies include, but are not limited to, the many different types of rules to which one or more entities are, may be, believe are or have agreed to be subject, such as statutes, regulations, common, civil and other laws; conditions of participation; survey, certification and enforcement requirements; accreditation standards and requirements; legal and other professional ethical rules and disciplinary requirements; rules of criminal, civil, and administrative procedure; evidence-base medicine and other evidence-base protocols in other/related disciplines; sentencing guidelines; rules relating to malpractice rate increases, adjustments and other related determinations; rules of financial, educational and other institutions; requirements contained in contracts, agreements, memoranda of understanding, engagement and other documents involving two or more entities; internal policies, procedures, protocols and other rules and requirements; requirements and provisions of bylaws, operating agreements; rules, requirements and requested information to complete applications, forms, filing and other documents; and so forth.

However, what has changed, and continues to change, is the manner in which rules of society rules are, and continue to be, defined, applied and enforced. Notably, significantly, and increasingly, society, its governmental and non-governmental authoritative bodies and its entities are seemingly becoming less reliant upon rules whose existence, foundation and credibility are inextricably linked or entwined with the ability and resources of their respective governmental or non-governmental authoritative bodies to find, prosecute and punish violators based on specific instances of volitional acts.

Society, instead, appears to be placing, and continues to place, increased reliance upon governmental and non-governmental authoritative bodies and their rules that assess, evaluate monitor or otherwise determine the status of entities based on the entities' initial and continued pattern of adherence, compliance, certification, mitigation against risk or loss prevention in a particular area. As such, greater responsibilities are being placed on entities to police, regulate, assess and monitor themselves relative to a particular area or topic.

In the United States, alone, recent examples of this rule-base evolution abound. With respect to governmental authoritative bodies, they include, but are not limited to: Sarbanes-Oxley compliance requirements on publicly-traded companies; compliance standards and implementation specifications of the Health Insurance Portability and Accountability Act ("HIPAA"); the recent efforts of the United States Office of Inspector General ("OIG") for the United States Department of Health and Human Services ("HHS") relative to compliance guidance on health care institutions, providers and other entities; HHS Centers for Medicare and Medicaid Services survey, certification and enforcement efforts relative to skilled nursing facilities ("SNFs") and nursing facilities ("NFs"); other federal Medicare and federal and State Medicaid conditions of participation, compliance and other rules and requirements; rule-base provisions and requirements for Medicare-related prescription drug coverage and benefits; United States Department of Labor ("DOL") compliance program requirements, dictates and efforts relating to employers, health and welfare benefits sponsors and other entities; United States Department of Defense ("DOD") activities that continue to impose corporate integrity and compliance program requirements on contractors and other entities affiliated or associated with DOD functions; previous and most recent federal regulations by the HHS relative to physician anti-referral regulations (Stark I and, recently, final regulations on Stark II); other federal government corporate integrity agreement and compliance program initiatives; and so forth.

With respect to non-governmental authoritative bodies, the trend continues relative to such organizations, practices and approaches, such as Six Sigma; accreditation standards, requirements, certification, efforts and activities of such entities as the Joint Commission on the Accreditation of Health Care Organizations, the National Committee for Quality Assurance, the American Accreditation Healthcare Commission, the Accreditation Association for Ambulatory Health Care, ISO 9000, the Capability Maturity Model for software development/information technology, Underwriters Laboratory, Inc., and others; medical, health care, and other professional best practices, guidance and evidence-based protocols; and so forth.

Consequently, ever-increasing demands are being placed on entities to assess, monitor, structure, organize, document, track, show, prove, establish or otherwise take action relative to its comprehension, commitment, adherence, compliance, risk mitigation and loss prevention with respect to numerous rules in numerous areas and relating to numerous topics. So, too, the governmental and non-governmental authoritative bodies increasingly are finding the need for a uniform, cohesive, structured and user-friendly system and method to facilitate and carry out their enforcement, oversight and compliance-related activities and efforts relative to the rules under their respective jurisdictions.

Looking, alone, at American businesses relative to federal regulations, the costs to entities meeting their federal rule-base compliance demands are staggering. According to a recent United States Small Business Association ("SBA") study, "[t]o comply with federal regulations, Americans spent $843,000,000,000.00 ($843 billion) in 2000." This is equivalent to eight percent (8%) of the gross domestic product ("GDP"); roughly $5,000 per each American employee; and $8,164 per each American household. In terms of burden to the America's workforce, the federal regulatory compliance paperwork burden is estimated at 6,600,000,000 (6.6 billion) hours per year.

Perhaps, what is more telling is the monies, resources and time that the above statistical accounting for American businesses does not include—namely, the other hundreds of billions, indeed trillions, of other dollars, hours and other resources spent each year in the United States and other nations and countries relative to rule-base compliance, certification, risk mitigation and/or loss prevention. Hereinafter, the use of the term or phrase, "rule-base compliance, certification, risk mitigation and/or loss prevention" shall be referred to as "rule-base compliance" or, simply, "compliance".

In many respects, this society's expenditures of time, monies and resources for rule-base compliance appear to be substantially driven by current inefficiencies that exist in the fields for which this within invention applies.

Currently, entities may enter into a time- or product/deliverable-limited contracts or engagements with outside professional law or other firms, services, individuals or other resources to address a particular segment, fragment or portion of their respective rule-base compliance environment. A typical example of such arrangements include, but is not limited to, when entities engage outside resources to draft or complete a particular standard, policy, procedure, protocol, agreement, form, application or other document. Once that task is done, the contract or engagement is concluded. What is more, such an engagement often times is extremely costly or, in some cases, prohibitively expensive to prevent entities from comprehensively or taking a more macrocosmic approach to dealing with other rules to which they are subject.

Alternatively, entities may contract or otherwise engage outside resources on a retainer or other continued basis. However, unless such retained outside resources are periodically/regularly on-site, at the entities' respective locations, such outside resources generally are "on call" to address a particular segment, fragment or portion of the respective entities' rule-base compliance. Again, such engagements are oftentimes costly and, in some cases, prohibitively expensive.

In either case, entities may also require significant time expenditures on their part, and often must do so at the convenience of the outside firms, services or individuals. Such working relationships are thus often not performed as efficiently as possible, especially if the outside firms, professionals or individuals are not in-house. So, too, such engagements may result in the actual or perceived loss of certain business independence on the part of the respective entities, potentially causing them to give over ownership of their rule-base compliance efforts, including even as to minute changes or alterations to or relative to such efforts at any given time.

In other cases, entities may budget or otherwise expend monies and resources to employ or otherwise delegate individuals, "in-house", to address their rule-base compliance efforts. Typical examples of such arrangements include, but are not limited to, internal legal departments or in-house counsel; when entities appoint internal individuals to handle matters relating to compliance; training and education specialists or departments; and/or other subject matter experts/individuals to address the entities' rule-base compliance environment. Still, without the employment and utilization of a standardized compliance system and method, such in-house persons are unable to continually ensure that its rule-base compliance needs are being met or continually managed.

At other times, entities may hold, attend, participate, carry out or otherwise become involved in training and education seminars, workgroups, roundtables, workshops, presentations, conferences, conference calls, internet/webcasts or other forums to learn about what they must or may need to do to become and stay compliant with various rule-bases.

In any event, and with respect to all cases cited above, it is often difficult for entities—or, for that matter, firms, services or individuals hired or otherwise engaged by the entities—to appropriately organize, track, retain, maintain or otherwise manage the compliance efforts of the entities, whether on paper or electronically, or in a manner consistent with the rule-bases to which they are subject.

Today, also, entities may budget or otherwise expend monies and resources to purchase certain computer/software products, packages, tools or other technology resources. Notwithstanding, such technology currently being budgeted or purchased by entities does not provide the same functionality to such entities as the system and method, as outlined, described, summarized and detailed as this invention, to facilitate, carry out, oversee or otherwise manage their compliance efforts or status. Among other things, current technology tends to require that entities already know the basic constructs of their rule-base compliance identity, for such technology to be of any utility to the entities. In addition, current technology only allows entities to profile and ascertain their rule-base compliance identity one rule at a time, as opposed to allowing entities to profile themselves relative to one or more rules at a time.

Further, technology currently used by entities does not allow the entities to conduct initial and ongoing compliance that takes into account their respective rule-base identity at any given time. In addition, even based on that rule-base identity, often the entities are not provided an assessment as to whether and, if so, how and/or to what extent a particular rule-base applies or does not apply. Because the entities are not provided an adequate assessment, the entities often may not have the complete and proper compliance documents and other resources, such as, for example, tools and resources to audit and monitor or otherwise assess their rule-base compliance status; tools and resources to address their compliance needs or desires relative to particular and specific parties, instances, events or circumstances; training and education materials specifically generated; and a means to store and archive compliance documents, records and related materials on an ongoing basis. Similar issues arise when the entity is an outside firm engaged to facilitate another entity's compliance efforts, and/or when the entity is an authoritative body examining the compliance efforts of another entity with regard to the authoritative body's rule-base.

For example, current technology may only permit entities to address disjunctive portions or parts of their rule-base needs—for example, the development of policies and procedures, but not training and education and assessment or monitoring.

In the meantime, while entities struggle with their rule-base compliance efforts and status, so, too, are governmental and non-governmental authoritative bodies whose charge or jurisdiction it is to enforce or otherwise oversee or monitor compliance with such rules. Currently, for examples, such bodies may use generic survey, certification, enforcement, compliance detection, auditing, monitoring, assessment inspection, quality assurance, quality improvement, performance improvement or other tools or resources to evaluate the level, degree and/or extent of rule-base compliance or non-compliance with a particular rule-base or set of rule-bases. So, too, they might offer certain technical assistance summaries, information, briefs, reports, guides, answers to "frequently asked questions", documents, tools and other resources to assist entities to address its rule-base compliance environment.

Thus, what is desired is a system and method for ensuring compliance, whether the entity examining compliance with a rule-base is one that is subject to the rule-base, one that is assisting rule-base compliance for another that is subject to a rule-base, and/or an authoritative body over-seeing compliance of its own rule-base by those subject to the rule-base.

SUMMARY

The various exemplary embodiments of the present invention includes a system to facilitate rule-base compliance, certification, risk mitigation and/or loss prevention activities, oversight and other management, comprising: one or more computing devices, including one or more processing means for processing data and one or more storing means for storing and archiving data; one or more inputting means for inputting criteria information representative of one or more entities and one or more rule-base structures, wherein the one or more rule-base structures comprise text, information, obligations, rights, expectations and documents associated with one or more particular rules; a knowledge base, comprising one or more rule-base structures; one or more profiling modules, wherein the one or more profiling modules analyze the criteria information of the one or more entities in relation to the one or more rule-base structures; one or more assessment of impact modules, wherein the one or more entities are provided with a determined relevancy of the one or more rule-base structures based on the one or more profiling modules to the one or more entities and a determined relevancy of one or more various aspects of the one or more rule-base structures to the one or more entities, further wherein the impact modules may be provided at any time; one or more document solution modules, wherein the one or more document solution modules generate one or more documents relevant to various general aspects of the one or more rule-base structures determined by the outcome of the one or more profiling modules to be applicable or otherwise relevant to the one or more entities, wherein the one or more document solution modules may be provided at any time; one or more auditing modules, wherein the one or more auditing modules monitors, assesses, evaluates, records and determines compliance and relevant documentation at a particular moment in time relating to the one or more entities in accordance with the one or more rule-base structures and the relevant aspects of the one or more rule-base structures at any time as determined by the one or more profiling modules at any time; and one or more customizable documentation means, wherein the one or more customizable documentation means generates documents of the one or more rule-base structures, such that only documents associated with the relevant aspects of the one or more rule-base structures to the one or more entities are generated and produced, based upon one or more particular instances, events, parties, requests, contracts, related matters, or the one or more the profiling modules at any time.

The various exemplary embodiments of the present invention further includes a method of assuring compliance with rule-base compliance, certification and/or risk management, comprising: inputting one or more rule-base structures into a computing device, wherein the rule-base structures comprise text, information, obligations, rights, expectations, rights expectations and documents associated with one or more particular rules; inputting criteria information representative of one or more entities into a computing device; analyzing the criteria information of the one or more entities in view of the one or more rule-base structures; providing the one or more entities with a determined relevancy of the one or more rule-base structures to the one or more entities; providing the one or more entities with a determined relevancy of one or more aspects of the one or more rule-base structures to the one or more entities; generating one or more documents that are relevant to the one or more aspects of the one or more rule-base structures determined to be relevant to the one or more entities; monitoring, recording and determining proper compliance and proper documentation by the one or more entities in accordance with the one or more rule-base structures and the various aspects of the one or more rule-base structures at any time; generating customizable documentation of the one or more rule-base structures, such that only documents associated with the various aspects of the one or more rule-base structures determined relevant to the one or more entities are provided; and saving data input for the one or more rule-base structures, criteria information of the one or more entities and the customizable documentation.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
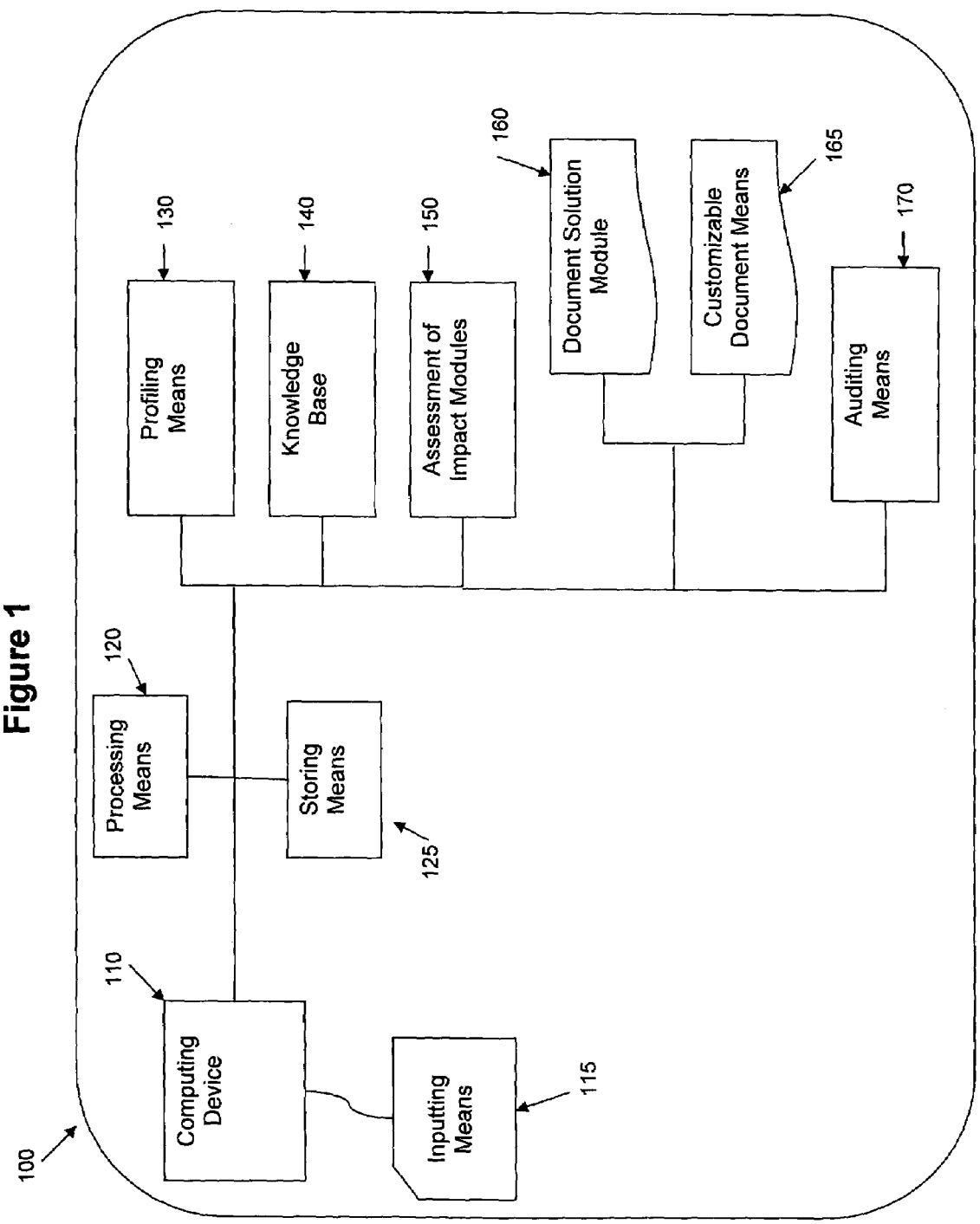
FIG. 1 is a schematic diagram of an illustrative arrangement of components allowing for the infrastructure to implement the various exemplary embodiments of the system and method of the present invention.

The various exemplary embodiments of the present invention comprise a new system and method of processing one or more rule-bases in relation to one or more entities to determine, assess, carry out, facilitate, document, record, oversee, audit, monitor, evaluate, track, assess and otherwise manage the compliance, certification, risk mitigation and/or loss prevention efforts and/or status of one or more entities to the one or more rule-bases of one or more governmental or non-governmental authoritative bodies.

As used herein, the term "governmental or non-governmental authoritative body", unless otherwise noted herein, includes, but is not limited to, any international, national, federal, state, commonwealth, territorial, local governments, federations, political subdivisions and their departments, agencies, law enforcement agencies and entities, commissions, divisions, courts, professional and other boards administrative tribunals, offices and other entities; international unions, tribunals and other entities; non-governmental professional and other associations, commissions, certification and accreditation bodies and other entities; quasi-governmental bodies and entities; non-governmental joint and other commissions, professional associations, standards boards and other related entities; malpractice, liability, indemnity and other insurance, re-insurance, stop loss and other insurers, providers and other entities; compliance, rule-making, risk mitigation and loss prevention departments, divisions, offices, officials and bodies of for- and non-profit corporations, businesses, firms, labor unions, collective bargaining units, boards, management committees, associations and other entities; community and family structures; and people, themselves.

As used herein, the term "rules of one or more governmental or non-governmental authoritative bodies", includes, but is not limited to rules promulgated, enforced, by or otherwise of governmental or non-governmental authoritative bodies to which one or more entities are, may be, believe are or have agreed to be subject, such as, but not limited to, statutes, regulations, common, civil and other laws; conditions of participation; survey, certification and enforcement requirements; accreditation standards and requirements; legal and other professional ethical rules and disciplinary requirements; rules of criminal, civil, and administrative proceedings procedures; evidence-base medicine; sentencing guidelines; rules relating to malpractice rate increases, adjustments and other related determinations; rules and requirements relative to post-graduate, graduate, higher education, secondary, elementary and continuing education, practicum, internship, training and apprenticeship requirements, standards and obligations; business and/or consumer credit, insurance, risk-base, actuarial determinations, assessments, scoring and rates; union and collective bargaining agreements, requirements, interpretative ruling and other related rules; compliance program guidance for health care and other entities; requirements contained in contracts, agreements, memoranda of understanding, engagement and other documents involving two or more parties; internal policies, procedures, protocols and other rules and requirements; requirements and provisions of bylaws, operating agreements; rules, requirements and requested information to complete applications, forms, filing and other documents; requirements, provisions, action items and goals contained in or relating to individual education or service plans; and other rules of governmental and non-governmental authoritative bodies.

Throughout the description herein of the various exemplary embodiments of the present invention, the term "rule" and/or "rule-base", is defined as rules of one or more governmental and/or non-governmental authoritative bodies.

Throughout the description herein of the various exemplary embodiments of the present invention, "entities" is defined, unless otherwise noted, to include, but is not limited to, any international, federal, state, local government or quasi-government, governmental or quasi-governmental agency, and/or governmental or quasi-governmental affiliated and/or sponsored group, entity or person; any international, multi-national, national, multi-jurisdiction or single jurisdiction corporation, business, firm, institution or proprietorship; any non-profit organization, federation, board working group or other non-profit entity; any union and/or collective bargaining unit; any family unit/structure, individual and/or group of individuals; and/or any combination and/or combinations thereof, to the extent such entities are, may be, believe are or have agreed to be subject to any rule-bases.

As used herein, the phrase "rule-base structure" is defined to include, but not be limited to, the text of the rule of interest, policies, procedures, protocols, forms, advisories, contracts, memoranda of understanding, decision trees and/or networks, associated proprietary algorithms, and any other documents and/or templates to ensure and facilitate compliance, certification, risk mitigation and/or loss prevention efforts and status of the one or more entities with respect to, relating and/or referring to a particular rule-base of interest.

Examples of particular rule-bases of governmental authoritative bodies for which this invention may be used and for which rule-base structures may be authored, developed, drafted, tailored, designed for, incorporated within or as part of, encompassed within or otherwise contained, included or encompassed within the system and method may include, but is in no event limited or restricted to, Sarbanes-Oxley compliance requirements relating to publicly-traded companies; compliance standards and implementation specifications of the Health Insurance Portability and Accountability Act ("HIPAA"), including, but not limited to privacy, security, transactions and code sets and unique identifiers; guidance of the United States Office of Inspector General ("OIG") for the United States Department of Health and Human Services ("HHS") relative to compliance guidance on health care institutions, providers and other entities; international, national, State and local homeland security statutes, regulations, rules, requirements and strictures; HHS Centers for Medicare and Medicaid Services survey, certification and enforcement efforts relative to skilled nursing facilities ("SNFs") and nursing facilities ("NFs"); federal statutes, regulations and other laws pertaining to Medicare-related prescription drug benefits and/or coverage; United States Department of Labor ("DOL") compliance program requirements, dictates and efforts relating to employers, health and welfare benefits sponsors and other entities; DOL occupational, safety and health statutes, regulations, non-regulatory guidance and other rules; federal statutory, regulatory and other legal requirements and other rules pertaining to financial, banking, mortgage, lending, consumer credit and/or other related institutions, firms or other entities; United States Department of Education statutes, regulations, non-regulatory guidance and other rules pertaining the formula and discretionary grant programs and initiatives, guaranteed and other student loan or grant programs or initiatives; federal formula and/or discretionary grant, cooperative agreement or technical assistance programs, initiatives or offerings contained or otherwise referenced within the Catalog of Federal Domestic Assistance; United States Department of Defense ("DOD") activities that continue to impose corporate integrity and compliance program requirements on contractors and other entities affiliated or associated with DOD functions; other federal government corporate integrity agreement and compliance program initiatives; international, tribal nation or other treaties; other statutes contained within the United States Code; other regulations contained within the Code of Federal Regulations; statutes and regulations contained within other governmental codes, codifications or other authorities; State and other board credentialing, continuing education, standards and other rules; rules contained in the Federal Rules of Civil Procedure and rules of civil procedure with respect to other governmental judicial or administrative tribunals; the Federal Rules of Criminal Procedure and rules of criminal procedure relative to other governmental criminal justice systems.

Examples of particular rule-bases of non-governmental authoritative bodies for which this invention may be used and for which rule-base structures may be authored, developed, drafted, tailored, designed for, incorporated within or as part of, encompassed within or otherwise contained, included or encompassed within the system and method may include, but is in no event limited or restricted to, principals, standards and other rules relating to Six Sigma; accreditation standards, requirements, certification, efforts and activities of such entities as the Joint Commission on the Accreditation of Health Care Organizations, the National Committee for Quality Assurance, CARF, the American Accreditation Healthcare Commission, the Accreditation Association for Ambulatory Health Care, ISO 9000, the Capability Maturity Model for software development/information technology, Underwriters Laboratory, Inc., and other non-governmental certification, licensing, accreditation and other commissions, bodies and entities; medical, health care, and other professional best practices, and guidance and evidence-based protocols, including, but not limited to evidence-base medicine; rules of one or more entities relative to their respective policies, procedures, procedures, contracts, agreements, union/collective bargaining agreements, joint ventures, partnerships, operating agreements; compliance programs, compliance integrity agreements, performance improvement programs, quality improvement, quality assurance and other related programs, initiatives and efforts of the one or more entities to carry out, facilitate, assess, oversee or otherwise manage their compliance efforts and status relative to rule-bases to which they are, may be, believe are or have agreed to be subject;.

Several of the various exemplary embodiments of the system and method of the present invention are set forth in FIGS. 1-9. The various exemplary methods and systems set forth in the drawings and described herein can be provided in software for single-user operation on stand-alone personal computers, for example, by a sole practitioner or for multi-user operations on a network used, for example, by an organization such as a health-care provider and associated groups in a single facility, group practice, organization, etc. wishing to ensure compliance with JCAHO, Medicare conditions of participation, CARF, federal anti-kickback, prohibitions, Stark I/II, HIPAA and/or Sarbanes-Oxley.

Whether the present invention is practiced on a stand-alone personal computer or a computer connected to a network, the computer is controlled by a central processing unit. The computer typically will include a random access memory (RAM) for temporary storage of information, a read only memory (ROM) for permanent storage of the computer's configuration and basic operating commands and an input/output (I/O) adapter for connecting peripheral devices such as a desk unit, a printer, personal data assistant (PDA), telephone, keyboard, mouse, microphone, speakers, etc. Visual output is provided via a display adapter connecting the computer to a display device, such as, for example, a video monitor. The computer is controlled and coordinated via an operating system software such as, for example, WINDOWS® developed and sold by the Microsoft Corporation, OS/2® developed and sold by International Business Machines (IBM) Corporation, Mac OS® developed and sold by Apple Computer, Inc.®, and Palm OS® developed and sold by Palm Computing, Inc.

FIG. 1 displays an exemplary embodiment of the present system 100 comprising a computing device 110 connected to an inputting means 115. The computing device 110 may be, for example, a stand-alone computer or a computer attached to a network, either by cable or by wireless transmission. Examples of computers may include, for example, laptops, desktop computers, PDA's, electronic notepads, and the like. The inputting means 115 may include, for example, a keyboard, mouse, microphone, disks, CD-ROM's, e-mail, digital voice recognizer, digital handwriting recognizer, electronic stylus and electronic writing area, and combinations thereof.

By use of the inputting means, one or more users may provide criteria information about one or more entities. As used herein, "criteria information" is defined as any and all information about the one or more entities required and/or desired by the system in order to best carry out, facilitate, oversee or otherwise manage the compliance, certification, risk-management and/or loss prevention efforts or status of the one or more entities in relation to the rule-base of interest.

The criteria information may vary significantly depending on the rule-base being examined. Further, the criteria information on a particular rule-base may change drastically even over a short period of time if, for example, the rule-base is modified or altered to any degree by its governing/over-seeing body. For these reasons, it would not be effective to set forth examples herein of criteria information as it may vary greatly depending on the rule-base.

However, it is preferred that the criteria information is input and analyzed by the system in such a way as to minimize the amount of work and resources of the one or more entities accessing the system according to the various exemplary embodiments of the present invention.

Thus, in a preferred embodiment of the present invention, the criteria information is input by one or more users by responding to one or more simple questions set forth by the system. The simple questions are preferably in the form of yes/no questions, multiple choice questions, fill-in-the-blank questions, review of suggested text, and combinations thereof.

The computing device 110 may be attached to a displaying means (not shown) as well as a processing means 120 for processing input and saved data, and a storing means 125 for temporarily and permanently saving data.

The inputting means 115 allows one or more users to provide data into the computing device to be processed and saved in the processing means and storing means. Examples of data input may include, for example, documents, programs, computer operating systems, rule-base structures, criteria information associated with one or more entities, etc.

The system 100 also comprises a knowledge base 140. The knowledge base comprises the rule-base structures and associated programmed decision trees. Thus, the knowledge base includes, for example, text of the rule of interest, policies, procedures, protocols, forms, agreements, notices, correspondence, announcements, advisories, contracts, memoranda of understanding, tracking tools, decision trees/networks, and any other documents, prototypes and/or templates.

The rule-base structures comprising the knowledge base differ and vary depending on the rule-base of interest. Whenever a rule-base is modified by a governing/legislative body, it is the knowledge base that preferably is revised to reflect the modification the rule-base itself and the subsequent rule-base structures.

The knowledge base pertaining to the rule-base structures may be updated and/or revised as needed and/or desired by direct manipulation by an authorized rule-base structure author, via a software revision download by way of the Internet, or by a software update on a storage device such as, for example, a diskette or CD-ROM.

The computing device is preferably connected to one or more profiling means 130. The one or more profiling means profile, examine, assess, analyze and/or otherwise evaluate the one or more entities relative to the rule-base of interest. For example, the profiling means may examine, assess, analyze and/or evaluate the one or more entities' duties, obligations, commitments, requirements, agreements, promises, rights, strictures and/or other expectations relative to the rule-base and rule-base structure of interest in view of the input criteria information about the one or more entities in relation to the rule-base.

Based on the criteria information and the rule-base, the profiling means preferably determines the relative compliance, certification and/or risk mitigation position of the one or more entities to the rule-base of interest.

In a preferred embodiment, the profiling means works in conjunction with the inputting means such that the profiling means evaluates an input response to a question, and determines the next one or more questions to be set forth to elicit further criteria information.

For example, if a user responds "yes" to a question set forth by the system, the profiling means may immediately evaluate the "yes" response and determine by way of, for example, a programmed decision tree, what the next question set forth should be. Further the profiling means may determine by way of one or more responses and a programmed decision tree, what aspects of a rule-base and rule-base structures are and are not relevant to the one or more entities.

The system according to the various exemplary embodiments of the present invention further comprises one or more assessment of impact modules 150.

The one or more assessment of impact modules of the various exemplary embodiments of the present invention compile, assess, compute, determine, suggest, analyze and otherwise provide an impact assessment. In a preferred embodiment, the impact assessment is explicit feedback setting forth the relevancy to and extent to which the one or more entities are directly and/or indirectly subject to the one or more rule-bases of interest. The impact assessment may further set forth the one or more rule-base structures that are relevant, and the extent to which the one or more entities is directly or indirectly subject to the one or more rule-base structures of interest.

In a more preferred embodiment, the impact assessment further provides the extent to which aspects or parts of the rule-base and/or rule-base structures are not relevant to the one or more entities.

The impact assessment may provide an explicit explanation or reasoning on why the rule-base, rule-base structures and/or aspects thereof are or are not relevant to the one or more entities.

The impact assessment may comprise one or more identifications of the questions presented by the system and/or responses provided by the one or more entities that determined the extent and relevancy of the rule-base, rule-base structures, and/or aspects thereof.

The one or more assessment of impact modules may use one or more text-based proprietary algorithms to analyze and compute the one or more entities' relevancy to the one or more rule bases. The algorithm to analyze and compute the relevancy of the one or more entities to the one or more rule-bases is triggered only after relevant inquiry is made of the one or more entities vis-à-vis the rule-base at issue.

The format of the impact assessment may comprise one or more textual reports; a series or list of numeric, textual or symbolic grades given to the rule-base, the rule-base structures, and/or aspects thereof; a checklist identifying relevancy of the rule-base, rule-base structures, and/or aspects thereof to the one or more entities; an identification of then-current compliance level on the part of the one or more entities in relation to the rule-base; documents or templates relevant to the one or more entities in view of the rule-base relevancy; links to documents, templates and definition related to the relevant rule-bases; educational services to explain the relevant rule-base to the one or more entities; suggestions for compliance, certification and/or risk mitigation on the part of the one or more entities in view of the relevant rule-base; alerts of recent and/or upcoming modifications to the rule-base; and combinations thereof. It preferred that the impact statement be set forth in simple language with as little legalese, industry-associated jargon, and the like. The impact assessment is meant to be easily and quickly understood by any and all that need to be associated with it.

The impact assessment may be in the form of a paper document and/or electronic document. In the embodiment wherein the impact statement is in the form of an electronic document, the impact assessment may comprise links to relevant rule-base structures and/or computer-based educational services.

The system according to the various embodiments of the present invention further comprises one or more document solution modules 160. The one or more document solution modules compute, generate, determine, suggest, analyze, compile, generate and/or otherwise provide copies of rule-base structures, i.e., for example, written policies, procedures, protocols, forms, agreements, notices, correspondence, announcements, advisories, contracts, memoranda of understanding, tracking tools, decision trees/networks and other computer and/or hard copy outputs that the one or more particular persons/entities are or may be needing, desiring, requiring, demanding, suggesting, recommending, requesting or otherwise invoking for the one or more particular persons/entities relative to its rule-base compliance, certification or risk mitigation environment.

In a preferred embodiment, the one or more document solution modules work in conjunction with the one or more profiling means and the one or more assessment of impact modules to determine and provide copies of required and/or suggested documents for compliance, certification and/or risk mitigation efforts of the one or more rule-bases of interest.

The one of more document solution modules preferably determine and generate the suggested compliance-related letters, agreements, tracking forms and other documents based on one or more text-based propriety algorithms and document templates that take into account both the impact assessment of the one or more entities and the rule-base of interest.

The one or more document solution modules may provide the required and/or suggested documents in a hard copy and/or electronic format.

The one or more custom document generation modules 165 further comprises the system of the various exemplary embodiments of the present invention, such that the one or more custom document generation modules provides the one or more entities with the ability to generate, for example, compliance-related letters, agreements, tracking forms, and other documents to better ensure compliance, certification and/or risk mitigation efforts regarding a rule-base.

The one or more custom document generation modules provides the custom documentation based upon the one or more profiling means, knowledge base, impact statement and responses given by the one or more entities.

The one or more custom documentation generation modules preferably may complete parts and answers on documents and forms of compliance, certification and risk mitigation efforts regarding one or more rule-bases to which the system has the answer based on the one or more profiling means, knowledge base, impact statement and responses given by the one or more entities. In other words, the one or more custom documentation generation modules may automatically complete documents required and/or suggested for compliance, certification and/or risk mitigation based on input criteria information and rule-base structures.

The system of the various exemplary embodiments may further comprise one or more auditing means 170. The one or more auditing means generate, aggregate, assemble, compile, construct, provide or otherwise provide or make available auditing, monitoring, non-compliance, certification or risk mitigation determination, assessment, analysis, and/or other compliance, certification or risk mitigation evaluation tools for the one or more entities to directly and/or indirectly use to audit, monitor, determine non-compliance, assess, analyze or otherwise evaluate the degree of compliance by the one or more entities.

In a preferred embodiment, the auditing means works in conjunction with the one or more profiling means, input criteria information, one or more assessment of impact modules, and the one or more document solution modules to present the monitoring of compliance, certification and risk mitigation efforts in relation to one or more particular rule-bases.

The monitoring of compliance, certification and risk mitigation efforts in relation to one or more particular rule-bases may be performed at any time by the one or more entities.

The auditing means may present the compliance, certification and risk mitigation efforts in relation to one or more particular rule-bases by way of a hard copy or electronic report. Such an auditing report may be a stand-alone report or it may be part of the impact assessment.

The auditing means may conduct monitoring and auditing of the compliance, certification and risk mitigation efforts in relation to one or more particular rule-bases of one or more entities at a predetermined interval of time. For example, if a professional must compile ten hours of continuing learning education (CLE) credits per annum, the auditing means may provide quarterly and/or annual auditing reports to identify the then-current CLE compliance level on the part of the professional.

Further, the auditing means may conduct audits at a predetermined interval of time prior to a particular compliance, certification and/or risk mitigation deadline to ensure an adequate period of time for the one or more entities to evaluate, ensure and/or complete compliance, certification and/or risk mitigation efforts before a deadline.

It is preferred that in-process, completed, submitted, varied versions, and saved reports, compliance documents and/or custom documents be retained in a secure document archive. Such a secure document archive may be in the form of a storing means 125 which includes a local and/or off-site electronic storage. The secure document archive is preferably encrypted and password protected to better ensure document preservation and legitimacy.

It is preferred that saving and archiving of such documents occurs automatically and does not require a user to prompt where to save particular documents.

The secure document archive should be accessible to the auditing means for better monitoring and evaluation of compliance, certification and/or risk mitigation of a rule-base.

It is preferred that manipulation and authoring of the documentation to report and/or ensure compliance, certification and/or risk mitigation is "user-friendly" and not require any specialized computer software development experience and/or education.

It should be understood that the rule-base structures are separate from the actual software/technology engines and interfaces utilized.

In a preferred embodiment, the system further comprises one or more perpetual, dynamic regeneration means (not shown) to allow the one or more entities, at any time, to re-run, revise and update criteria information, regulatory profiles and to regenerate new impact assessment, reports, policies, procedures, protocols, notices, forms and other written materials; interactive customized auditing means; and custom document text-based algorithms and templates to take into account any changes or updates to the regulatory of the one or more entities.

Rule-bases and rule-base structures, sometimes by their nature, are modified and/or updated to fulfill additional needs and/or requirements. In order to further ensure compliance, certification and/or risk mitigation the one or more entities in relation to the one or more rule-bases, the system according to the various exemplary embodiments herein may comprise one or more Application Service Provider (ASP) or other computer-based environments to provide the one or more entities with updates to modifications in the one or more rule-bases that may require the one or more particular persons/entities to rerun its profile and regenerate applicable reports, documents and A&M and custom document compliance tools.

The more preferred computer-base environment would be a networking capability, for example, the Internet, that would allow for real-time updates to rule-bases and rule-base structures from a central hub server whenever modifications are made to the one or more rule-bases. Modifications may be identified to the one or more entities by way of electronic message, impact assessment, and/or special or regular mailing. Further, the system may be arranged such that the computing device checks for updates to the rule-base and rule-base structures via the network at a predetermined interval of time.

Figure 2:
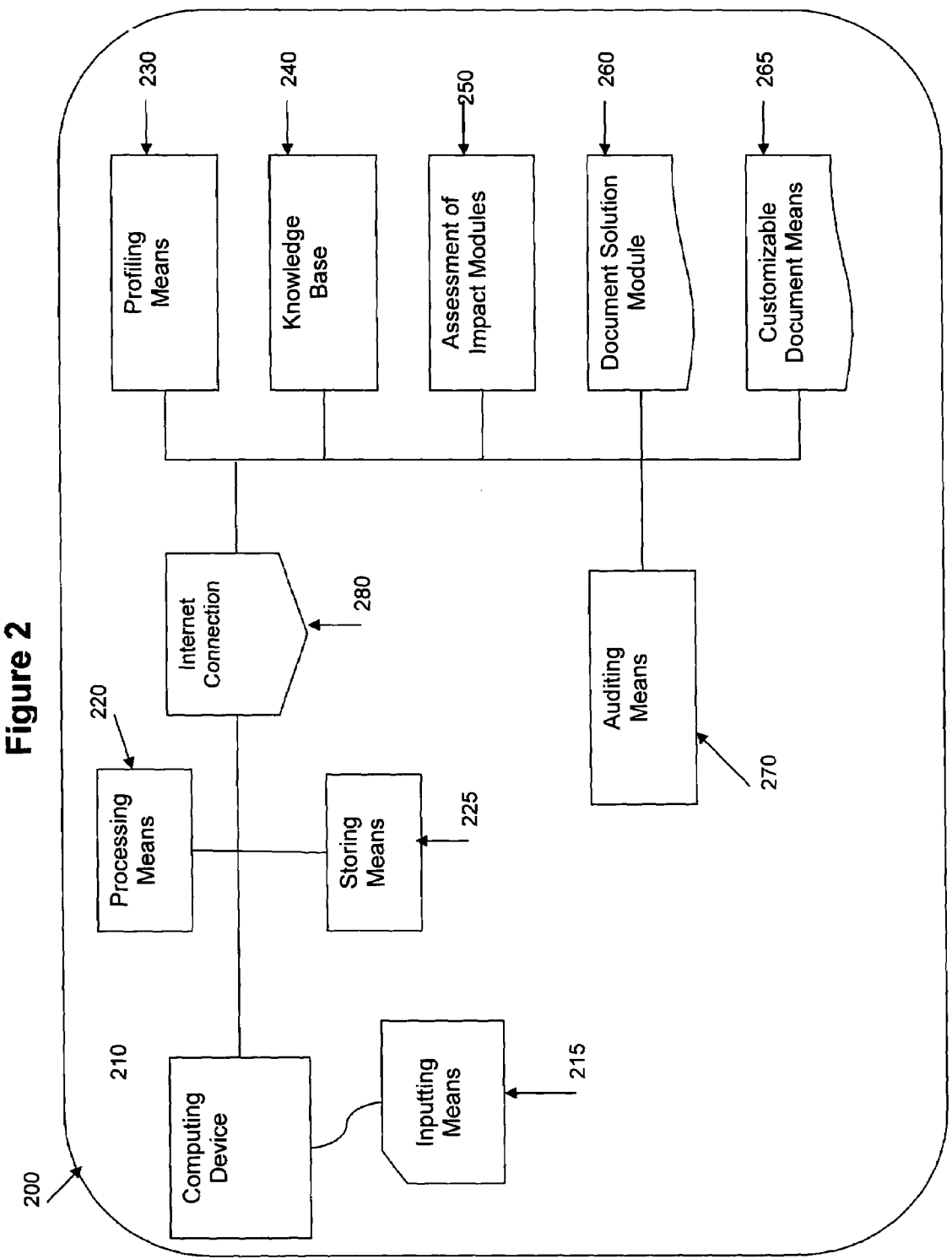
FIG. 2 is another schematic diagram of another illustrative arrangement of components allowing for the infrastructure to implement the various exemplary embodiments of the system and method of the present invention.

FIG. 2 is a schematic illustration of an exemplary system 200 according to the present invention wherein the computing device 210 and inputting means 215 comprise a processing means 220 and storing means 225 locally. The computing device is connected to the one or more profiling means 230, the knowledge base 240, the one or more assessment of impact modules 250, one or more document solution modules 260, the customizable document means 265 and the auditing means 270 by way of an Internet connection 280.

An internet or website connection as in the present invention may be, for example, a dial-up connection to a service provider such as, for example, Prodigy®, AOL®, etc.; broadband and/or cable connection; or wireless transmission.

Figure 3:
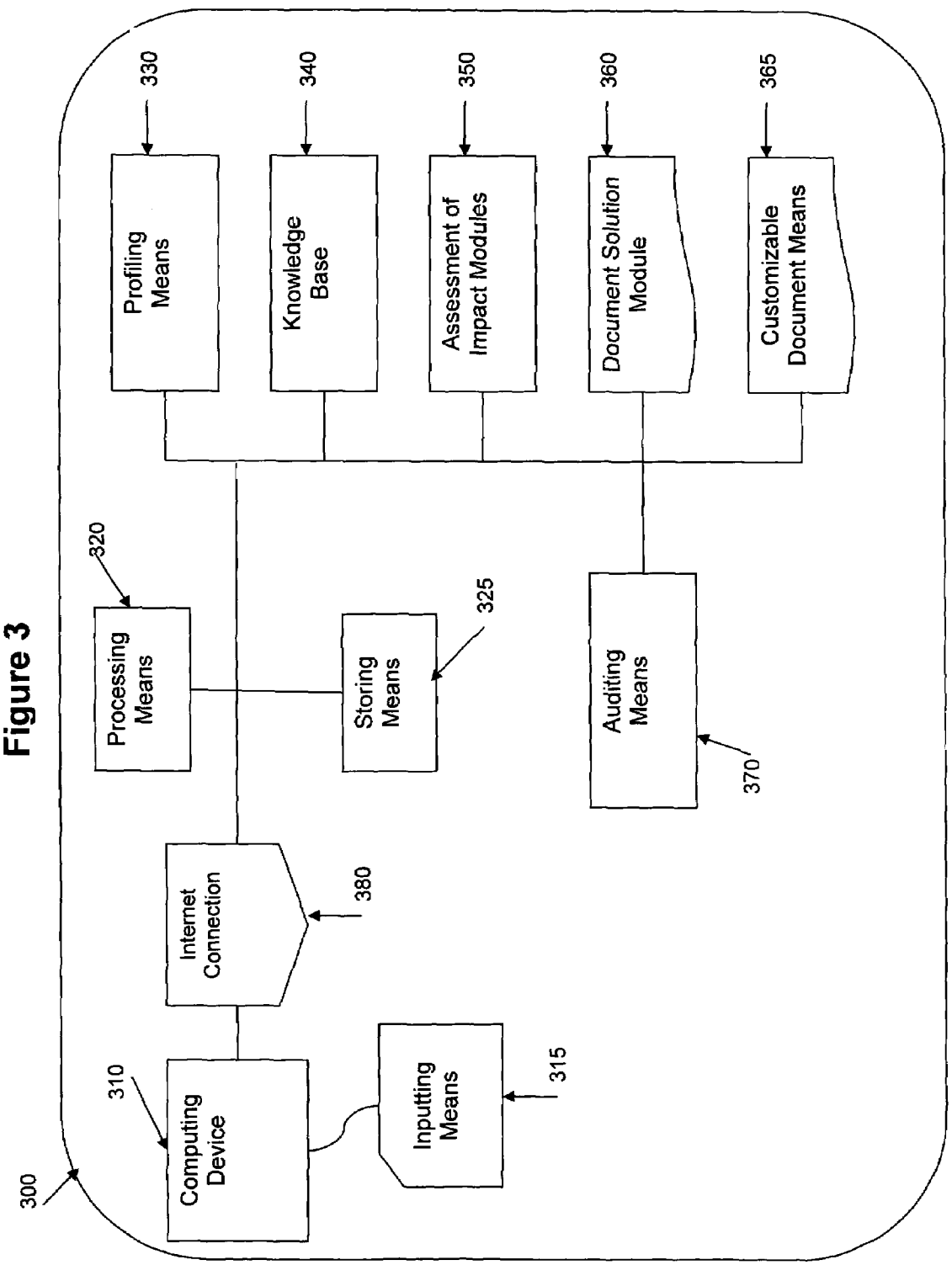
FIG. 3 is yet another schematic diagram of yet another illustrative arrangement of components allowing for the infrastructure to implement the various exemplary embodiments of the system and method of the present invention.

FIG. 3 is a schematic illustration of an exemplary system 300 according to the present invention wherein the computing device 310 and inputting means 315 are connected to a processing means 320, storing means 325, the one or more profiling means 330, the knowledge base 340, the one or more assessment of impact modules 350, one or more document solution modules 360, the customizable document means 365 and the auditing means 370 by way of an Internet connection 380.

It may be desired for consumers, customers, others with whom an entity does business/carries out functions, an entity's authoritative bodies, and the entity itself to connect to the system in order to facilitate the ability of the person or entity, such consumers, customers and others and the person's or entity's authoritative bodies to address compliance, certification or risk mitigation issues relative to the person or entity. Thus, various embodiments of the present invention allow for secure access to an entity's storing means by any and all parties that the particular entity wishes to allow access. Such access may be by Internet.

Figure 4:
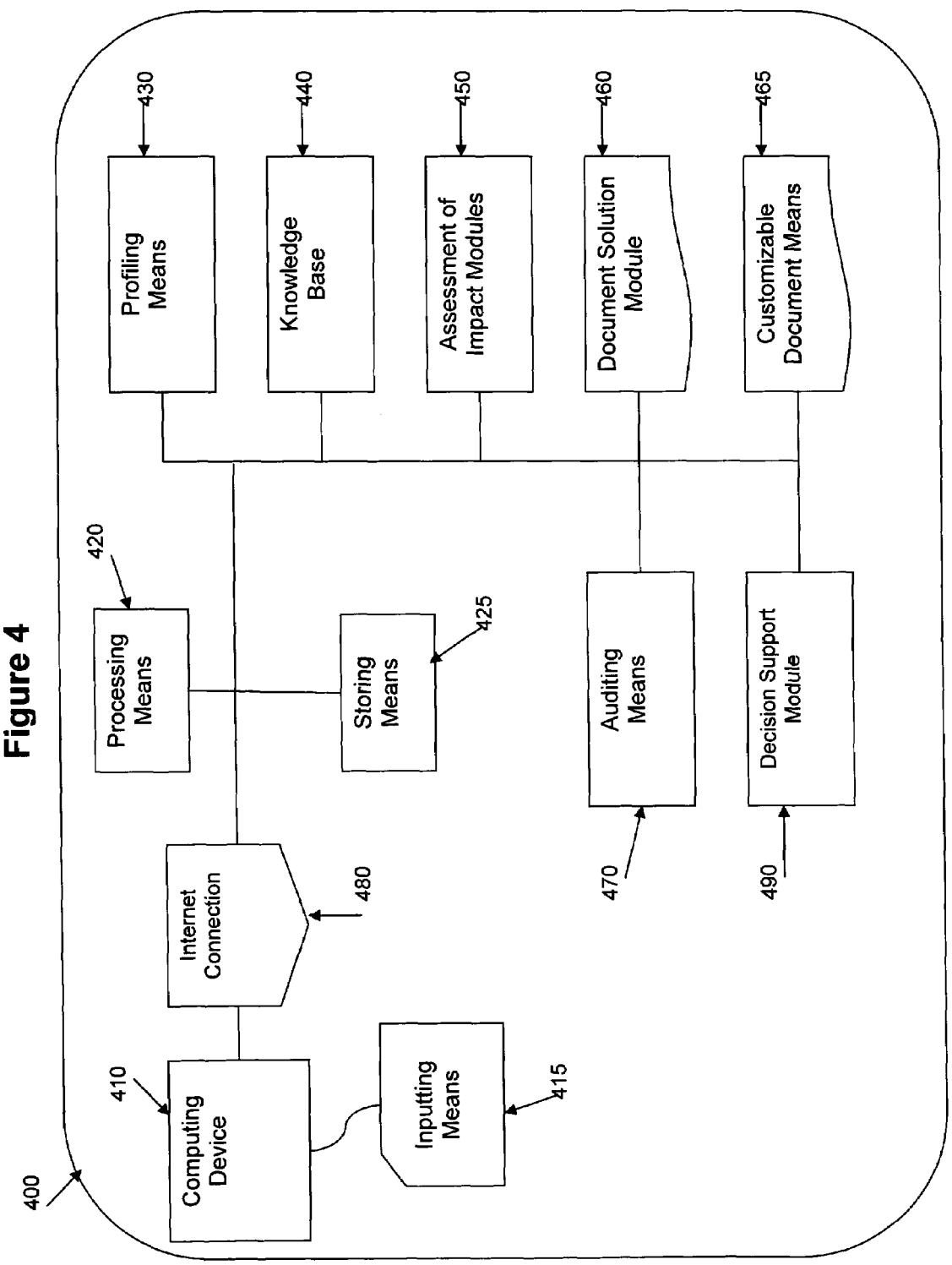
FIG. 4 is a schematic diagram of another of the various exemplary arrangements of components allowing for the infrastructure to implement the various exemplary embodiments of the system and method of the present invention.

FIG. 4 is a schematic illustration of an exemplary system 400 according to the present invention wherein the computing device 410 and inputting means 415 are connected to a processing means 420, storing means 425, the one or more profiling means 430, the knowledge base 440, the one or more assessment of impact modules 450, one or more document solution modules 460, the customizable document means 465, the auditing means 470, and one or more decision support modules 490 by way of an Internet connection 480.

The one or more decision support modules 490 provide feedback, input and guidance to or on behalf of the one or more entities to facilitate compliance with a particular rule-base structure and/or ensure proper documentation based on the inter-relationship of one or more rule-bases and aspects of the one or more rule-base structures to a particular issue, event, circumstance, party or topic.

The one or more decision support modules may be in real-time, and may be automatic. That is, for example, the one or more decision support modules may alert a user whenever a questionable and/or special circumstance arises. Or, the one or more decision support modules may interject assistance only when prompted to do so by a user.

The one or more decision support modules may provide explanations, definitions, examples, and results of potential decisions by a user. That is, the results of potential decisions means that the one or more decision support modules may show what rule-bases, rule-base structures and aspects thereof may be modified with regard to the one or more entities' compliance, certification and risk mitigation efforts depending on how one or more responses are given by the user. Thus, it may provide guidance before a user gets too far down-stream in the inputting of criteria information.

Figure 5:
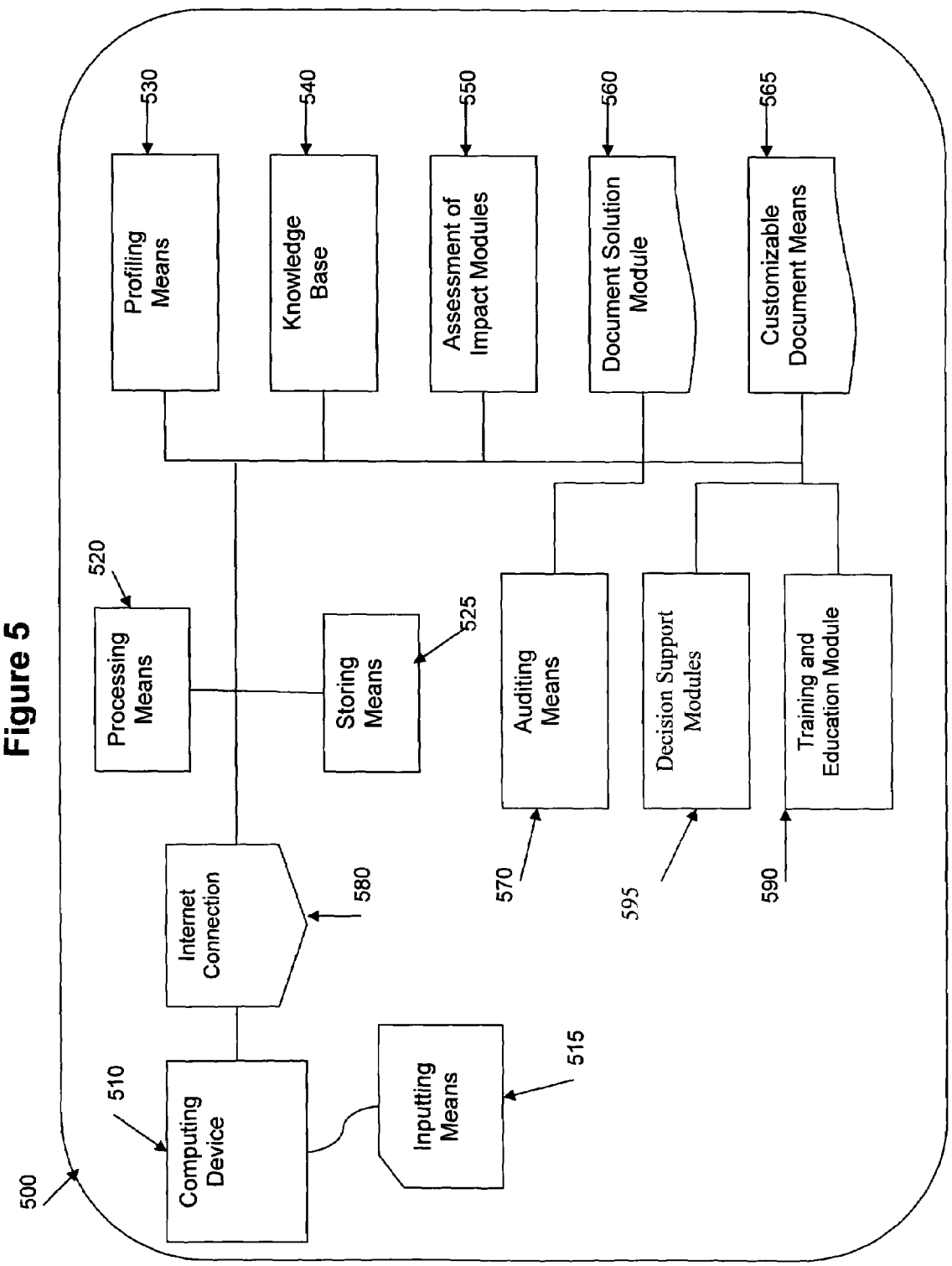
FIG. 5 is a schematic diagram of yet another of the various exemplary illustrative arrangements of components allowing for the infrastructure to implement the various exemplary embodiments of the system and method of the present invention.

FIG. 5 is a schematic illustration of an exemplary system 500 according to the present invention wherein the computing device 510 and inputting means 515 are connected to a processing means 520, storing means 525, the one or more profiling means 530, the knowledge base 540, the one or more assessment of impact modules 550, one or more document solution modules 560, the customizable document means 565, the auditing means 570, one or more decision support modules 590, and one or more training and education modules 590 by way of an Internet connection 580.

The one or more training and education modules 590 provides entity-specific training information to assist the one or more entities in compliance, certification and/or risk mitigation efforts of one or more rule-bases at any time.

The one or more training and education modules may be in the form of website and/or other electronic presentations, materials, feedback, scoring, training courses, chat rooms, and/or message centers.

The system according the various exemplary embodiments of the present invention may, for example, work in conjunction with the above-identified operating systems, as well as other commercially available software authoring and/or reading tools.

The various exemplary embodiments of the present invention includes a method for assuring compliance, certification and risk mitigation of rule-bases, comprising the steps of inputting one or more rule-base structures into a computing device, inputting criteria information representative of one or more entities into a computing device, analyzing the criteria information of the one or more entities in view of the one or more rule-base structures, providing the one or more entities with a determined relevancy of the one or more rule-base structures to the one or more entities, providing the one or more entities with a determined relevancy of one or more aspects of the one or more rule-base structures to the one or more entities, generating one or more documents that are relevant to the one or more aspects of the one or more rule-base structures determined to be relevant to the one or more entities, monitoring, recording and determining proper compliance and proper documentation by the one or more entities in accordance with the one or more rule-base structures and the various aspects of the one or more rule-base structures at any time, generating customizable documentation of the one or more rule-base structures, and saving data input for the one or more rule-base structures, criteria information of the one or more entities and the customizable documentation.

Figure 6:
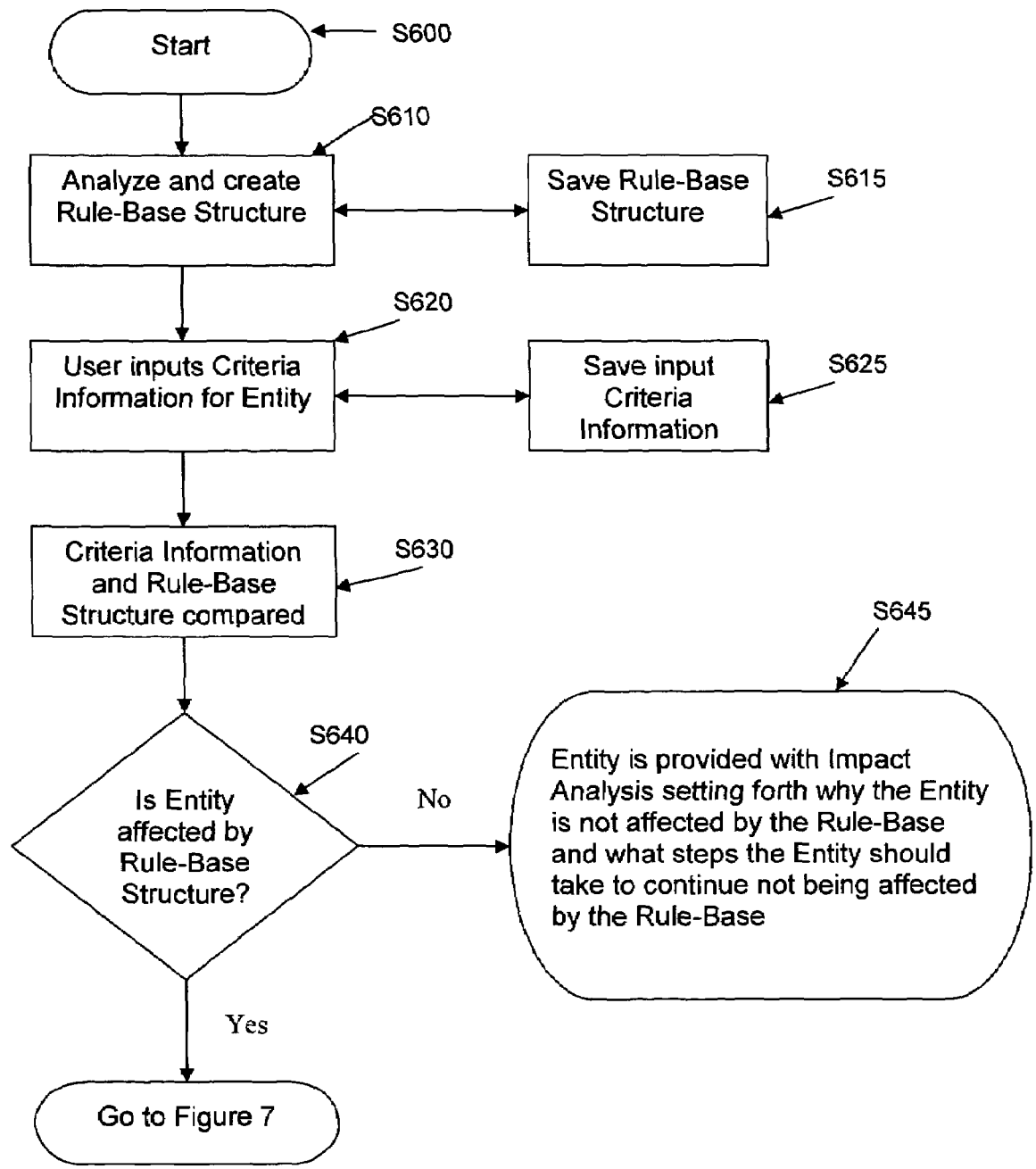
FIG. 6 is flowchart setting forth one of the various exemplary methods according to the present invention.

FIG. 6 illustrates a flow chart setting forth an exemplary embodiment of the present invention. The process starts S600 and a particular rule-base is analyzed, examined, processed. In analyzing the rule-base, the rule-base structure, including any and all document templates, outlines, proprietary algorithms, questions for users/entities, general profiles, agreement letters, etc. are developed S610 and saved in the system according to the exemplary embodiments of the present invention S615.

Once the rule-base structure is developed and input into the system, a user connects to the system and inputs criteria information regarding the one or more entities by responding to one or more series of simple questions. See step S620. The simple questions are preferably in the form of yes/no questions, multiple choice questions, fill-in-the-blank questions, and combinations thereof.

The criteria information is saved S625, preferably in the storing means. The criteria information is stored as the simple questions are responded to by the user, and creates an entity profile based on the input criteria information that can be accessed at a later time via the storing means of the system.

As the user responds to the simple questions, the input criteria information and the rule-base structures are compared S630 by the system to identify whether or not the one or more entities are compliant, certified, regulated and or risk mitigated by way of the associated rule-base S640. If the one or more entities are not determined to fall under the compliance, certification, or risk mitigation guidelines, regulations, etc. of the particular rule-base, the one or more entities are provided with an impact assessment describing why the one or more entities are not affected by the rule-base and rule-base structures. Further, such an impact assessment sets forth what actions the one or more entities must continue to pursue under the then-current rule-base to ensure that the one or more entities may continue to not be affected by the rule-base. See S645.

However, if the one or more entities are determined to even potentially be required or suggested to be in compliance with the particular rule base, the entity is presented with an impact assessment S700. See FIG. 7.

In a preferred embodiment, the impact assessment is explicit feedback setting forth the relevancy to and extent to which the one or more entities are directly and/or indirectly subject to the one or more rule-bases of interest. The impact assessment may further set forth the one or more rule-base structures that are relevant, and the extent to which the one or more entities is directly or indirectly subject to the one or more rule-base structures of interest.

In a more preferred embodiment, the impact assessment further provides the extent to which aspects or parts of the rule-base and/or rule-base structures are not relevant to the one or more entities.

The impact assessment may provide an explicit explanation or reasoning on why the rule-base, rule-base structures and/or aspects thereof are or are not relevant.

The impact assessment may comprise one or more identifications of the questions presented by the system and/or responses provided by the one or more entities that determined the extent and relevancy of the rule-base, rule-base structures, and/or aspects thereof.

The impact assessment should provide an assessment regarding the aspects of the rule-base structures that may be associated with the one or more entities. See S710. If the one or more entities is not regulated by all the rule-base structures, that is, for example, only specific sections of the overall rule-base applies, then the impact assessment presents just those aspects of the rule-base structure that applies. See S715.

Upon review of the aspects of the rule-base structure determined and/or suggested to be related to the one or more entities, the user has the option of agreeing with the impact assessment. See S725. If the user does not agree with the presented aspects of the rule-base structures determined and/or suggested to be related to the one or more entities, the user may have the impact assessment re-evaluated by the system. See S730.

The situation regarding re-evaluating the rule-base structure and the criteria information may arise, for example, if the user believes that one or more aspects to which the one or more entities should be regulated is missing, the user believes that too many aspects of the rule-base structure are being presented, additional criteria information has been provided after the creation of the impact assessment, the rule-base from which the rule-base structure is developed has been modified, and the like.

If the entity is regulated by all aspects of the rule-base structure, and/or if the user agrees with the presented aspects of the rule-base structure determined/suggested for the one or more entities related to a particular rule-base, then documents associated with the relevant rule-base structures are produced. See S720. Upon review of the documents associated with the relevant rule-base structures, the user may disagree with the presentation S725 and request re-evaluation of the one or more entities in relation to the rule-base S630.

Figure 7:
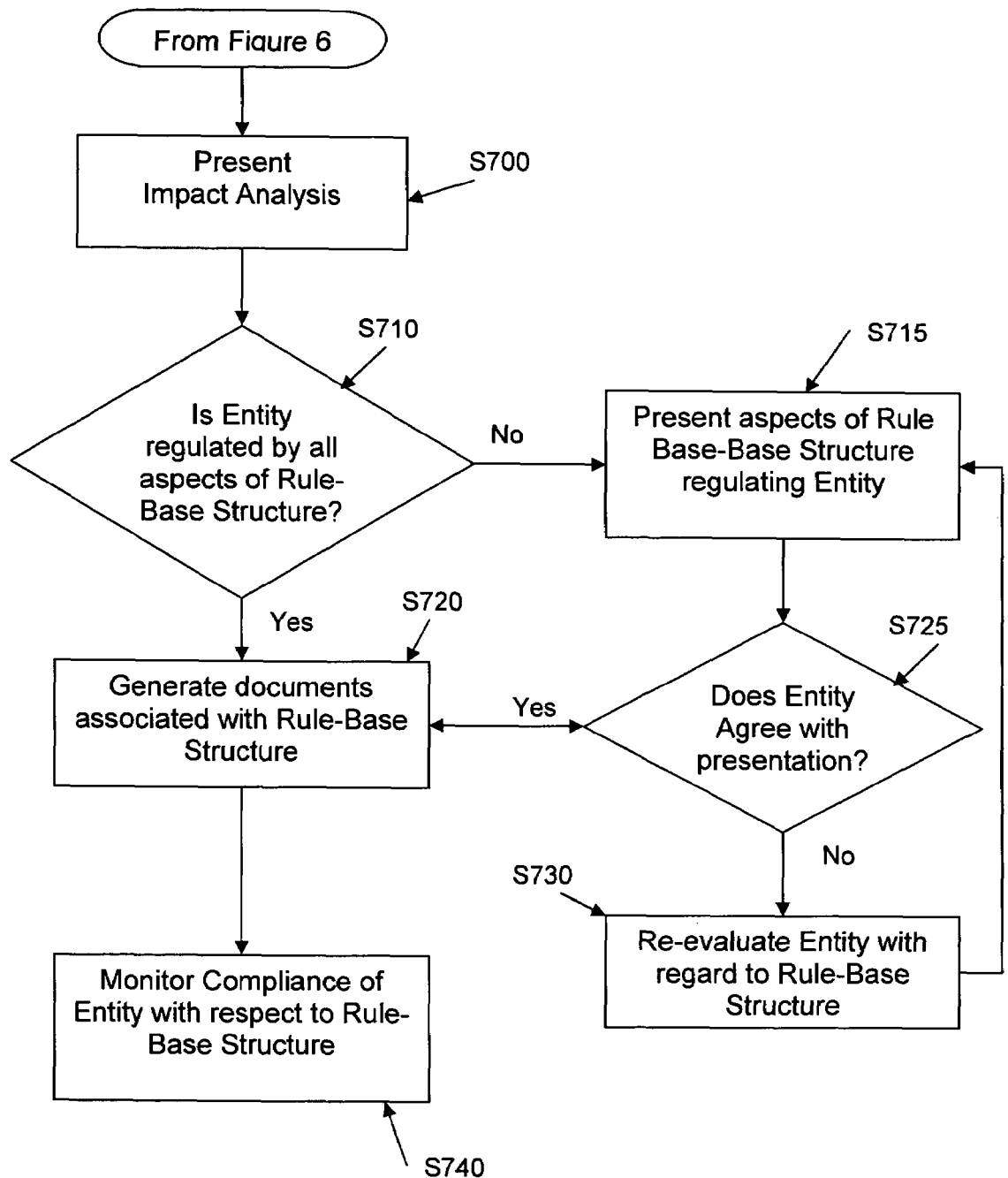
FIG. 7 is a flowchart of one of the various exemplary embodiments of the present invention.
Figure 8:
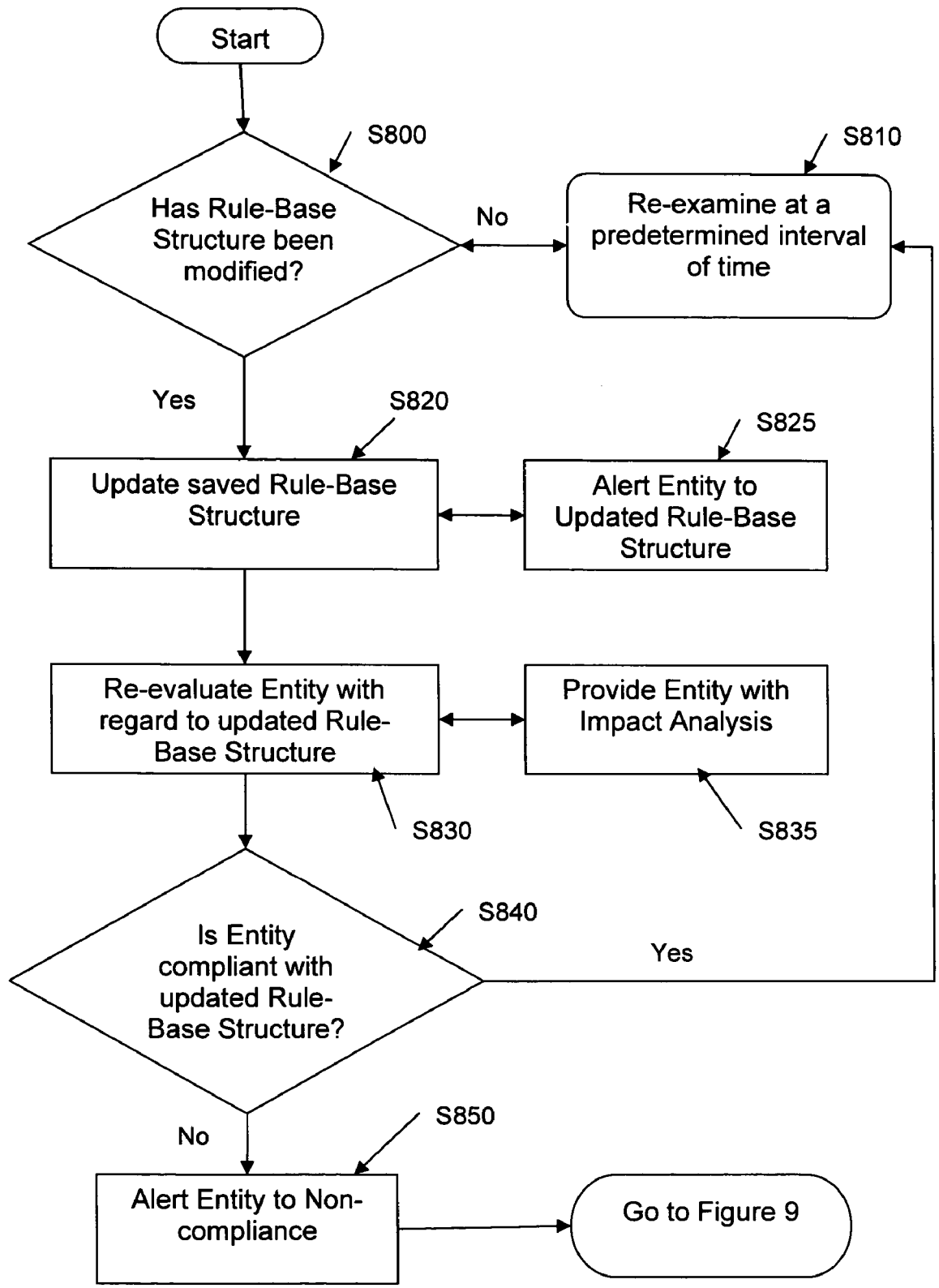
FIG. 8 is a flowchart illustrating one of the various exemplary embodiments of the present invention.
Figure 9:
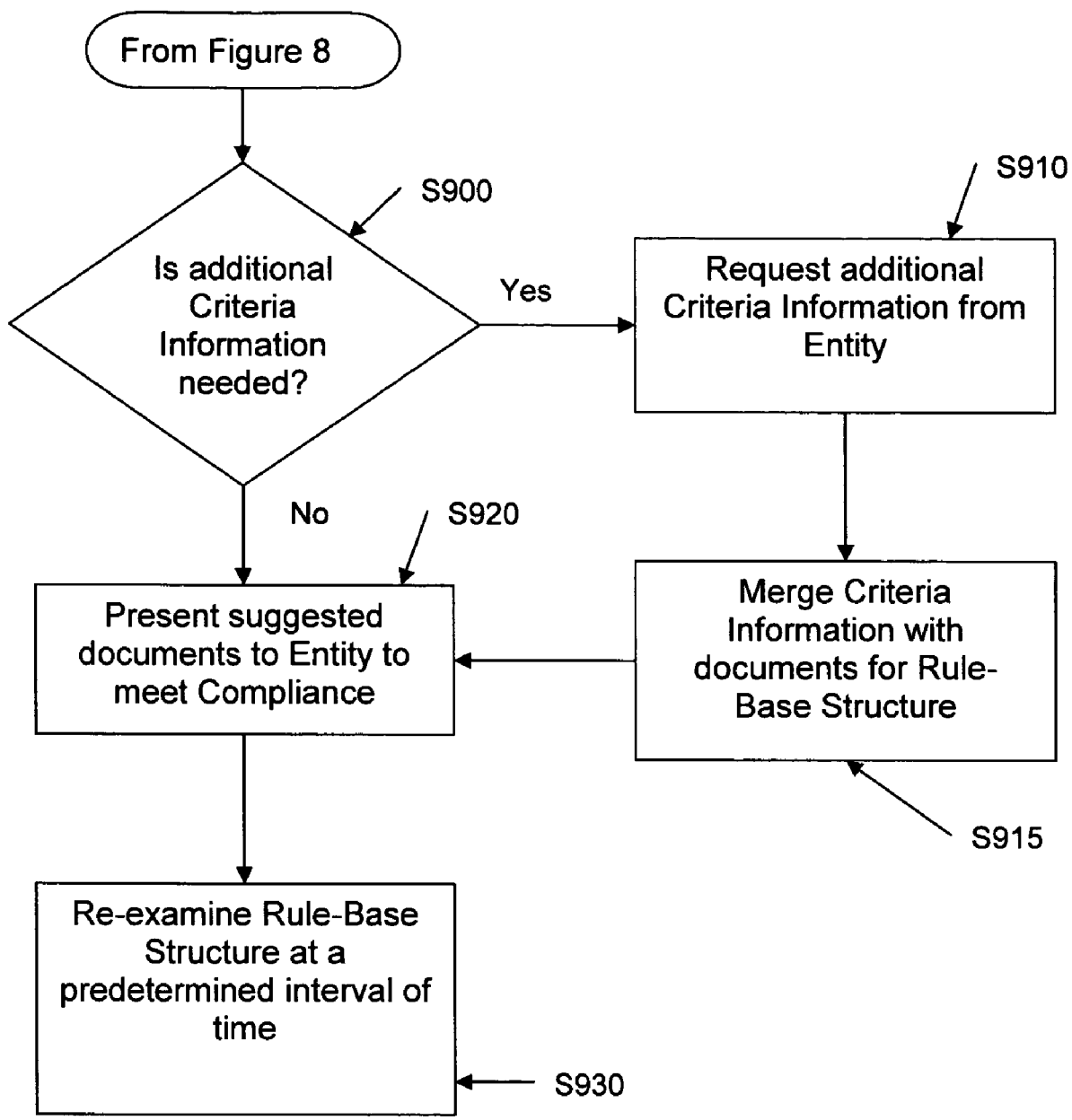
FIG. 9 is a flowchart according to one of the various exemplary embodiments of the present invention.

In the exemplary embodiment set forth in FIG. 7, once the documents associated with the relevant rule-base structure are generated S720, the one or more entities can monitor their respective compliance, certification or risk mitigation in regard to the rule-base at any time as the documents, and various versions of the documents generated, are saved by the system according to the present invention.

According to the various exemplary embodiments of the present invention, a set of documents that may provide a "compliance program" may be developed from the documents generated via the system and method the present invention. Such a set of documents may describe the policies and procedures or other processes that the one or more entities can follow in order to demonstrate that they are following or "in compliance" with the rule-base, or what steps the one or more entities should continue to pursue to ensure that it does not become necessary for the one or more entities to start being compliant, certified, etc. with the particular rule-base.

Such set of documents generated and saved by the system further provides the ability of the one or more entities to monitor on a regular basis the state of compliance, for example, demonstrating that the compliance programs have been implemented and are still being followed.

The method of gathering and saving criteria information according to the system and method the present invention provides the ability for the one or more entities to go back and modify any and all the criteria information as needed or desired and re-generate any and all compliance documents from a single point of control in the event that either the rule-base changes or the one or more entities changes behavior that changes the relevancy of the one or more entities to the particular rule-base.

The actual rule-base itself and/or the associated rule-base structures may be modified over time. Whether or not such modifications occur, S800, the system can re-examine a centralize rule-base structure at a predetermined interval of time to compare the rule-base structure comprised in the system and the centralized rule-base structure. See S810.

Such a centralized rule-base structure may be connected to via a network, for example, the Internet, or an updated rule-base structure could be copied from the centralized rule-base structure and forwarded electronically via a network or by disk or other storage method to each computing device to ensure the latest rule-base structure is available to the one or more entities.

If the rule-base structure has been modified, the updated rule-base structure is saved to the system. See S820. In a preferred embodiment, the one or more entities are alerted to the update and the one or more modifications to the rule-base structure, and how, if at all, the one or more entities are affected by the updated rule-base structure. See S825. Such an alert may be by a special message to the one or more entities, or it may be part of a regular or on-going impact assessment during an audit or monitoring procedure on the part of the one or more entities.

Upon updating the rule-base structure, the system may re-evaluate the one or more entities, S830, and may provide an updated impact assessment setting forth what aspects of the one or more rule-base structures the one or more entities are or are not complaint. See S835. The impact assessment, as with all the impact analyses of the present invention, may also set forth how and why the one or more entities are not regulated by other aspects of the rule-base.

If the one or more entities continues compliance with the relevant rule-base in view of the one or more modifications to the rule-base structure, the rule-base structure continues to be monitored and re-evaluated at a predetermined interval of time. See S840 and S810. If the one or more entities fall out of compliance because of modifications to the one or more rule-base structures, the impact assessment should alert the one or more entities of the noncompliance. See S850 and FIG. 9.

Due to the one or more modifications to the one or more rule-base structures, additional criteria information regarding the one or more entities may be required by the system. See S900. If additional criteria information is needed, it will be requested of the one or more entities by the system, preferably in the form of simple questions. See S910. The additional criteria information would then be evaluated in view of the rule-base structures, and merged to present suggested documents for the one or more entities to be compliant with the rule-base in view of the one or more modifications to the rule-base structures. See S920.

If additional criteria information is not required, but further documents may be needed or submitted on behalf of the one or more entities, the system may determine the documents needed and/or suggested, and generate them for the one or more entities. See S920. Again, the rule-base structure would be re-examined at a predetermined interval of time. See S930.

The present invention is relevant to any person, entity or industry vis-à-vis any regulatory or rule-base to which they are accountable. As such, those industries and businesses to which this invention is applicable include, for example, but are in no way limited to employers required to comply with federal regulations in the areas of human resources, health and welfare benefits, occupation safety and health; environmental protection (including, but not limited to, federal Summary Plan Description, Form 5500, claims Procedures; HIPAA privacy rule; COBRA; ADA; other Equal Employment Opportunity; Family and Medical Leave Act; OSHA workplace medical surveillance and injury reporting (perhaps, in the future, extensive ergonomics requirements); and other federal regulatory requirements.

Additional examples entities to which are regulated by rule-bases include publicly-traded companies required to comply with federal securities regulations (including, but not limited to, a substantial number of new regulations that are the result of Sarbanes-Oxley); health care providers required to comply and document compliance with a large number of federal regulations, including entities specially identified by the United States Department of Health and Human Services ("HHS") Office of Inspector General ("OIG") for Compliance Program Guidance (pharmaceutical industry; hospitals; long-term care providers; medical transportation providers; home health/durable medical equipment providers; third party billing companies; physicians; etc.); schools and universities receiving federal funds and, therefore, subject to extensive regulation by the United States Department of Education ("ED") and other federal government agencies/offices.

Banks and financial institutions must comply with, for example, federal regulatory requirements relating to privacy; lending; advertising; determining annual percentage rates; initial, periodic and subsequent disclosure statements to consumer; and resolving billing errors and credit balances. Mining companies, including those subject to specific federal regulations on coal exploration; obtaining, processing, renewing, assigning, selling permits/permit rights; legal, financial and mining specific compliance documentation; and minimum requirements relating to surface and underground mining reclamation, operation, and environmental plans.

It can be applied on behalf of corporations with government contracts, both relative to bidding and carrying out a particular government contract. They can be applied to any entity receiving funding from the United States Department of Housing and Urban Development ("HUD"). They even are applicable to any candidate running for federal elected office, as each such candidate must be, stay and that it is compliant with federal regulations set forth in Title 11 of the CFR (Federal Elections).

It can be applied relative to accreditation requirements, best practices, evidence-base protocols, and any other rule-base.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A system to enable rule-base compliance, certification and/or risk mitigation management, comprising:
    one or more computing devices, including one or more processing means for processing data and one or more storing means for storing and archiving data;
    one or more inputting means for inputting criteria information representative of one or more entities;
    a knowledge base, comprising one or more rule-base structures saved in the system, wherein the one or more rule-base structures comprise one or more decision trees, one or more document templates, and one or more programmed decision trees, wherein:
        the one or more decision trees represent one or more rule-bases relating to the rules of an authoritative body and comprise questions related to facilitating compliance, certification, risk mitigation management, or combinations thereof, with respect to the one or more rule-bases, wherein the questions are developed through the use of an authoring tool,
        the one or more document templates are configured to be completed based on the criteria information inputted by the one or more entities in response to the questions posed by the one or more decision trees, and
        the programmed decision trees comprise computer-readable files representing the decision trees and are configured to be processed by a separate software engine;
    one or more profiling modules, wherein the one or more profiling modules: analyze the criteria information of the one or more entities in relation to the one or more rule-base structures, determine the relative compliance, certification and/or risk mitigation position of the one or more entities to the rule-base, and determine the next one or more questions to be set forth to elicit further criteria information;
    one or more assessment of impact modules, wherein the assessment of impact modules determine the relevancy of the one or more rule-bases relative to one or more entities and provide one or more impact assessments determining relevancy of the one or more rule-bases based on the one or more profiling modules of the one or more entities and determining relevancy of the one or more rule-base structures to the one or more entities, further wherein the one or more impact assessments are configured to be provided at any time;
    one or more document solution modules, wherein the one or more document solution modules generate one or more documents relevant to various general aspects of the one or more rule-base structures and managing of compliance efforts or status relative to one or more rule-bases, further wherein the one or more document solution modules interact with the one or more profiling modules such that the one or more document solution modules are configured to be accessed and provided at any time; and
    wherein the knowledge base and rule-base structures are separate from the profiling module, the assessment of impact module, and the document solution module such that a modification to the knowledge base or a rule-base structure does not require a modification to the profiling module, the assessment of impact module, or the document solution module.

2. The system according to claim 1, further comprising:
    one or more customizable documentation means, wherein the one or more customizable documentation means generates documents based on the criteria information and the one or more rule-base structures, such that only documents associated with the relevant aspects of the one or more rule-base structures to the one or more entities are generated and produced, based upon one or more particular instances, events, parties, requests, contracts, related matters, or the one or more the profiling modules at any time, wherein the completed documents facilitate one of compliance, certification, risk mitigation management, or combinations thereof, with respect to the one or more rule-bases; and one or more training and educating modules, wherein the one more training and education modules provide entity-specific training information to provide interactive and passive training and education to or on behalf of the one or more entities relating to the one or more rule-bases and the relevant one or more rule-base structures at any time.

3. The system according to claim 2, wherein the entity-specific training information is in a format selected from the group consisting of hard copy and electronic-base website presentations, materials, feedback, and scoring.

4. The system according to claim 2, wherein the one or more training and educating modules are determined and based upon the one or more profiling modules.

5. The system according to claim 1, further comprising:

one or more decision support modules, wherein the one or more decision support modules provide feedback and guidance to or on behalf of the one or more entities to facilitate compliance, a particular compliant action, proper documentation based on an inter-relationship of rule-base and the one or more rule base structures to a particular issue, event, circumstance, party or topic, or combinations thereof.

6. The system according to claim 5, wherein the one or more decision support modules are based upon and determined by the one or more profiling modules at any time.

7. The system according to claim 1, wherein the storing means is selected from the group consisting of:

an off-site electronic document storage and archive, wherein documents comprise policies, procedures, forms, notices, contracts, agreements, memoranda of understanding, tracking forms and results and all other documents generated by use of the system in accordance with the relevant one or more rule-bases and the one or more rule-base structures at any time, determined and based upon the one or more profiling modules at any time;

local electronic document storage;

hard copies of relevant documents; and combinations thereof.

8. The system according to claim 1, wherein the rule-base structures further comprise data, documentation, one or more requirements, best practices, guidance, or combinations thereof related to one or more rule-bases relevant to the one or more entities.

9. The system according to claim 1, wherein the criteria information is input in response to one or more questions relative to the one or more entities, the one or more rule-bases, or combinations thereof.

10. The system according to claim 1, wherein the one or more profiling modules further determine whether enough criteria information has been collected relative to the one or more entities, the one or more rule-bases, or combinations thereof.

11. The system according to claim 1, wherein the one or more profiling modules analyze input criteria information to determine and request subsequent criteria information relevant to the one or more entities needed or desired by the system.

12. The system according to claim 1, wherein the criteria information relevant to the one or more entities input is modified and manipulated at any time.

13. The system according to claim 1, wherein the one or more profiling modules determines the one or more rule-bases and one or more rule-base structures that are not relevant to the one or more entities based upon the criteria information input, such that the one or more profiling modules provides one or more impact assessments reporting the rule-bases and rule-base structures not relevant to the one or more entities, and why the rule-bases and rule-base structures are not relevant.

14. The system according to claim 1, wherein the documents are written policies, procedures, protocols, forms, agreements, notices, correspondence, announcements, advisories, contracts, memoranda of understanding, tracking tools, decision trees, certifications, risk assessments, prescriptions, diagnoses, or combinations thereof.

15. The system according to claim 1, wherein the rule-base structures are modifiable.

16. The system according to claim 1, further comprising an alerting means, wherein the alerting means advises the one or more entities when modifications are made to the one or more rule-base structures.

17. A method of assuring compliance with rule-base compliance, certification and/or risk management, comprising:

inputting one or more rule-base structures into a computing device, wherein the one or more rule-base structures comprise one or more associated programmed decision trees, wherein the one or more decision trees represent one or more rule-bases relating to the rules of an authoritative body, wherein the one or more rule-base structures are configured to facilitate one of compliance, certification, risk mitigation management, or combinations thereof, with respect to the one or more rule-bases;

inputting criteria information representative of one or more entities into a computing device;

analyzing the criteria information of the one or more entities in view of the one or more rule-base structures with a separate software engine, wherein the analysis determines the relative compliance, certification and/or risk mitigation position of the one or more entities to the rule-base;

providing the one or more entities with a determined relevancy of the one or more rule-base structures to the one or more entities;

providing the one or more entities with a determined relevancy of one or more aspects of the one or more rule-base structures to the one or more entities;

generating one or more documents that are relevant to the one or more aspects of the one or more rule-base structures determined to be relevant to the one or more entities;

monitoring, recording and determining proper compliance and proper documentation by the one or more entities in accordance with the one or more rule-bases and the one or more rule-base structures at any time; and automatically generating customizable documentation based on the criteria information and the one or more rule-base structures, such that only documents associated with the various aspects of the one or more rule-base structures determined relevant to the one or more entities are provided wherein the customizable documentation facilitates one of compliance, certification, risk mitigation management, or combinations thereof, with respect to the one or more rule-bases.

18. The method according to claim 17, wherein the generating customizable documentation is automatically determined, completed and prepared based on the criteria information of the one or more entities.

19. The method according to claim 17, wherein the documents comprise written policies, procedures, protocols, forms, agreements, notices, correspondence, announcements, advisories, contracts, memoranda of understanding, tracking tools, decision trees, certifications, risk assessments, prescriptions, diagnoses, and combinations thereof.

20. The method according to claim 17, further comprising re-examining the rule-base structure for modifications at pre-determined intervals of time, and updating the input rule-base structure if modifications are made.

21. The method according to claim 17, further comprising alerting the one or more entities when modifications are made to the one or more rule-base structures.

22. The method according to claim 17, further comprising converting portions of the one or more rule-base structures into one or more simple questions to be answered by the one or more entities to more accurately determine a relationship between the one or more entities and the one or more rule-base structures.

23. The method according to claim 22, wherein the simple questions are selected from the group consisting of yes/no, multiple choice, fill-in-the-blank, or review of suggested text or combinations thereof.

24. The method according to claim 17, further comprising providing an impact assessment to the one or more entities to set forth how aspects of the one or more rule-base structures do and do not affect the one or more entities.

25. The method according to claim 24, wherein the impact assessment identifies one or more particular simple questions to present how various aspects of the one or more rule-base structures do and do not affect the one or more entities.

26. A system to enable rule-base compliance, certification and/or risk mitigation management, comprising:
  a computing device, including a processing device for processing data and a storing device for storing and archiving data;
  an inputting device for inputting criteria information;
  a knowledge base including a rule-base structure, wherein the rule-base structure comprise one or more associated programmed decision trees, wherein the one or more decision trees represents a rule-base relating to the rules of an authoritative body, wherein the rule-base structure is configured to facilitate one of compliance, certification, risk mitigation management, or combinations thereof, with respect to the rule-base;
  a software engine that is separate from the rule-base structure, wherein the software engine analyzes the criteria information in relation to the rule-base structure and determines the relative compliance, certification and/or risk mitigation position of one or more entities to the rule-base;
  one or more profiling modules, wherein the one or more profiling modules: analyze the criteria information of the one or more entities in relation to the rule-base structure, determine the relative compliance, certification and/or risk mitigation position of the one or more entities to the rule-base, and determine one or more questions to be set forth to elicit further criteria information;
  one or more assessment of impact modules, wherein the assessment of impact modules determine relevancy of a rule-base relative to the one or more entities and provide one or more impact assessments determining relevancy of a rule-base based on the one or more profiling modules of the one or more entities and determining relevancy of a rule-base structure to the one or more entities, further wherein the one or more impact assessments are configured to be provided at any time; and
  a customizable documentation means, wherein the customizable documentation means automatically generates completed customized documents based on the criteria information and the rule-base structure, wherein the completed documents facilitate one of compliance, certification, risk mitigation management, or combinations thereof, with respect to the rule base.

* * * * *